United States Patent [19]
Kazakis et al.

[11] Patent Number: 5,967,179
[45] Date of Patent: Oct. 19, 1999

[54] LOW PROFILE DISCHARGE CHECK VALVE

[75] Inventors: Michael V. Kazakis, Simpsonville; Murtaza R. Dossaji, Spartanburg; Charlie E. Jones, Greenville, all of S.C.

[73] Assignee: Westinghouse Air Brake Company, Wilmerding, Pa.

[21] Appl. No.: 09/017,247

[22] Filed: Feb. 2, 1998

[51] Int. Cl.[6] .................................................. F16K 15/00
[52] U.S. Cl. ........................... 137/538; 137/881; 137/543
[58] Field of Search ................... 137/538, 515.7, 137/542, 543.15, 543, 881, 543.17

[56] References Cited

U.S. PATENT DOCUMENTS

| | | | |
|---|---|---|---|
| 2,173,930 | 9/1939 | Brandt | 137/543 |
| 2,641,278 | 6/1953 | Eplett et al. | 251/368 X |
| 3,587,632 | 6/1971 | Clay | 137/543 |
| 4,525,183 | 6/1985 | Cordes et al. | 137/543.15 X |
| 4,768,550 | 9/1988 | Krechel et al. | 137/881 X |
| 4,986,297 | 1/1991 | Ross | 137/881 X |

*Primary Examiner*—Denise L. Ferensic
*Assistant Examiner*—Ramyar Farid
*Attorney, Agent, or Firm*—James Ray & Associates

[57] ABSTRACT

A low profile valve for discharging pressurized air to a system for utilizing such pressurized air. The valve includes a housing for mounting in or to an associated structure, and has at least one opening through which pressurized air is directed to and from the valve. A piston is located in the housing for axial movement therein, and the piston has a face portion containing a seal for sealing the piston against a fixed surface of the associated structure. In addition, a spring can be located about the piston for biasing the piston in the direction of the fixed surface.

7 Claims, 2 Drawing Sheets

LOW PROFILE DISCHARGE CHECK VALVE

CROSS-REFERENCE TO RELATED APPLICATION

The invention taught in this application is related to inventions taught in the following related application: "Twin Tower Air Dryer", Ser. No. 09/017,245 filed concurrently herewith and U.S. patent application Ser. No. 08/979,649 filed Nov. 26, 1997. The disclosures of these applications are incorporated herein by reference thereto.

FIELD OF INVENTION

The present invention relates generally to check valves having a low profile for compactness, and is particularly suitable for use in air dryers of the type disclosed in the above cited applications.

BACKGROUND OF THE INVENTION

All such dryers discharge dry pressurized air to systems utilizing such air, which systems often include main reservoirs that store the air for use by such systems. Dry air is discharged from the dryers through a check valve, and the valve remains closed when discharge air is not available to open the valve. The purpose of such a valve is to seal an air compressor and air dryer from the pressure contained within the main reservoir when the air compressor is idle and to prevent any loss of main reservoir pressure (MRP) through the compressor. In the first of the above applications there is an objective to make such an air dryer as compact as possible since ample space is not always available for containing dryers.

OBJECTS OF THE INVENTION

Thus, a primary objective of the invention is to seal a compressor and air dryer from main reservoir pressure when the compressor is turned off, and not to allow the loss of main reservoir pressure through the compressor. In the present invention, this objective is obtained by use of a compact, low profile check valve that requires a minimum amount of space in the equipment and environment in which it is used.

SUMMARY OF THE INVENTION

The valve of the present invention has a shallow housing containing a relatively shallow piston body and a biasing spring. The face of the valve is provided with a seal, such as an O-ring, that seats and seals against a fixed surface of an associated structure to which the valve is attached or located therein, and which moves away from such surface when it receives a positive pressure at the face of the valve and seal.

The valve, in addition, can be provided with openings in a side wall of a housing of the valve to provide fluid communication through the valve when the piston is in a sealing, closed relationship with the surface of the supporting structure. When the valve opens, pressurized air flows freely through the housing and to a system or systems using such air.

When no positive pressure is applied to the face of the piston, back pressure from the system using the air forces the piston against the sealing surface so that pressure does not leak from the system. A small spring located in the housing can assist in such sealing function.

THE DRAWINGS

The invention, along with its objectives and advantages, will be better understood from consideration of the following detailed description and the accompanying drawings in which.

PREFERRED EMBODIMENT OF THE INVENTION

Figure 1:
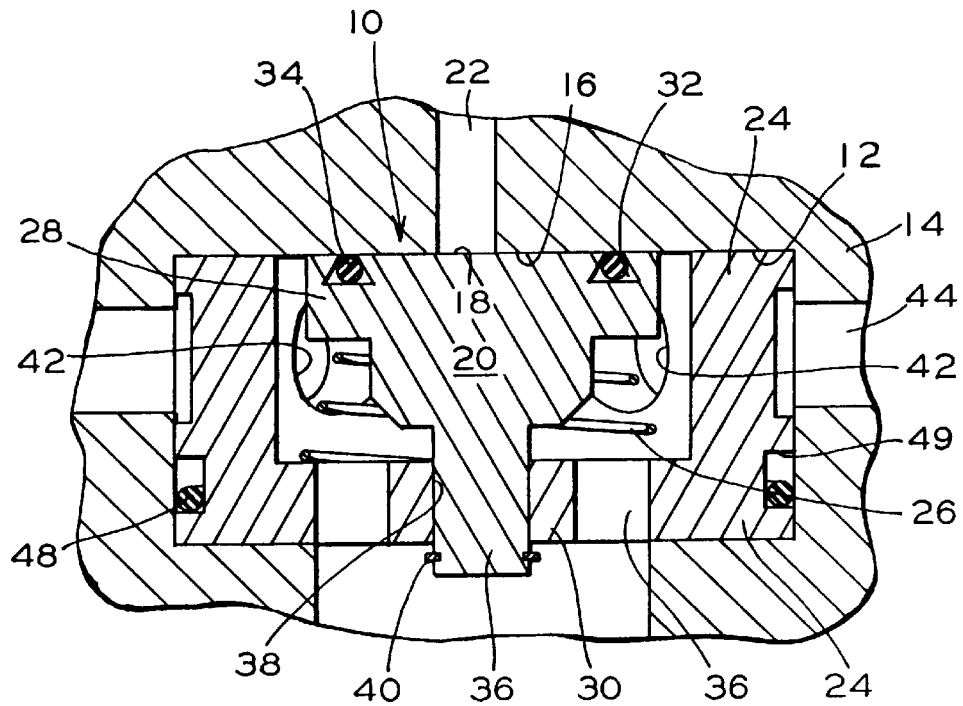
FIG. 1 is a sectional view of the low profile valve of the invention.

Referring now to the drawings, FIG. 1 of which shows a shallow, low profile check valve 10 which, in FIG. 1, is shown located in a shallow recess 12 of a structure 14. Structure 14 can, for example, be a manifold block of the type shown in the above concurrently filed U.S. patent application Ser. No. 09/017,245 entitled "Twin Tower Air Dryer", though the invention is not limited thereto.

Structure 14 provides a fixed surface 16 against which a face 18 of a piston 20 of valve 10 is shown seated (FIG. 1). A port 22 is provided in structure 14 in fluid communication with the face of the piston and with the interior of valve 10 when the piston moves away from fixed surface 16.

Valve 10 includes further a shallow housing 24 containing piston 20. A coil spring 26 is shown surrounding the piston and located between an enlarged section or flange 28 of the piston and the inner surface of lower wall portion 30 of the housing. The flange portion 28 of the piston provides a relatively broad face 18 having a dove tail groove 32 holding an O-ring 34 that protrudes from face 18.

In addition, piston 20 has an integral extension or stem 36 that extends into an opening 38 provided in lower wall 30 for axial, sliding movement therein. The opening and extension are sized to provide a close fit yet allow easy sliding of the extension in the opening and in contact with the surface of the opening. Preferably, the piston and its extension are made of a non-metallic material, such as Nylon or Teflon, which are self-lubricating so that extension 36 and opening 38 do not require further lubrication.

As seen in FIG. 1, the distal end of extension 36 is located outside of valve housing 24 and beyond housing wall 30, and is provided with a ring 40, seated in the extension, that serves to retain the piston in the housing.

Figure 3:
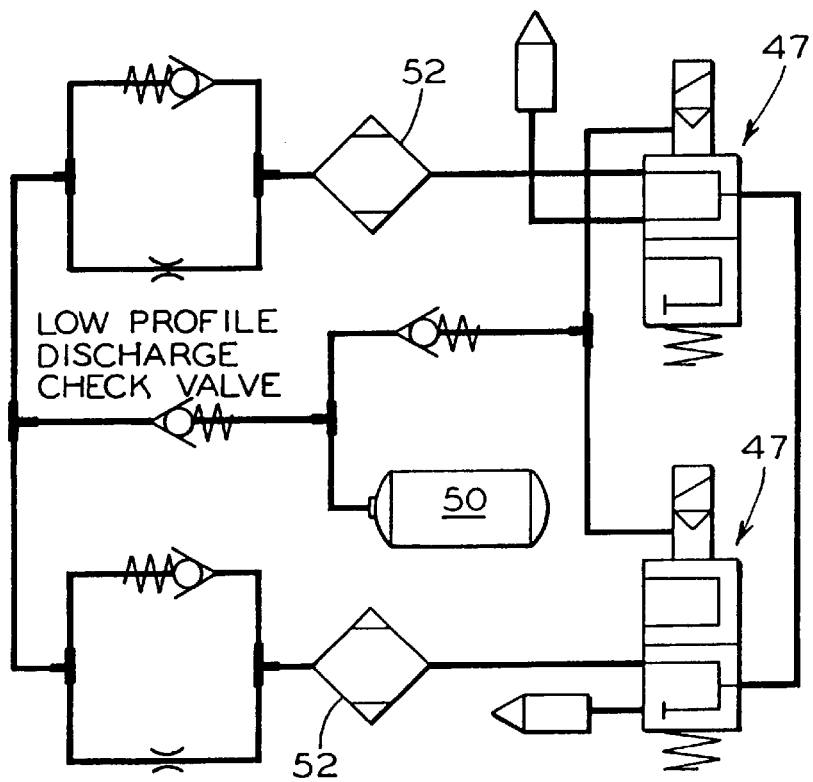
FIG. 3 is a schematic view of the valve connected to two shuttle valves in a twin tower desiccant dryer system.
Figure 2:
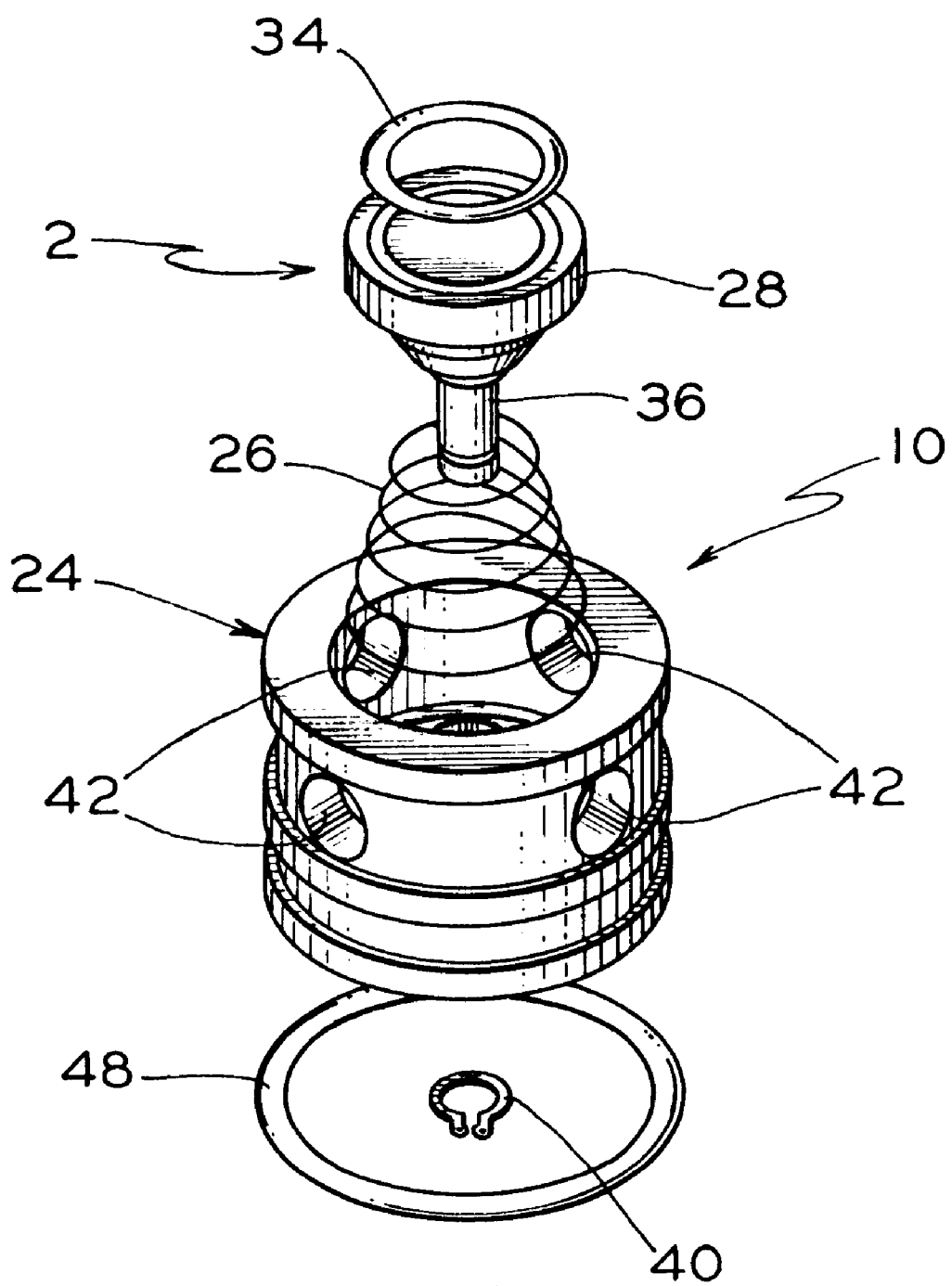
FIG. 2 is an exploded view of the valve of FIG. 1.

In FIG. 2, four ports 42 are shown provided in the side of housing 24, which ports align and communicate with ports 44 provided in structure 14 when piston 20 moves to surface 16. Ports 42 and 44 can communicate, for example, with the control valves disclosed in the above cited application Ser. No. 08/976,649 that effects the switching of twin drying towers. Such valves are shown schematically in FIG. 3 of the drawings, and are labelled by numeral 47.

A second O-ring 48 is provided for sealing valve housing 24 in and to structure 14. In FIG. 2, the O-ring is shown seated in a periphical groove 49 provided in the outside surface of the side wall of the housing.

Valve 10 functions in the following manner. When pressurized air is received in port 22 of structure 14, a force is created on face 18 of piston 20, which moves the face from surface 16 and translates the body of the piston to wall 30 of piston housing 24. Piston extension 36, of course, moves through opening 38 in wall 30, and spring 26 compresses between the piston body and wall 30 of housing 24. The pressure in port 22 can be that pressure supplied by an air compressor supplying dry air to a reservoir 50 (FIG. 3), the air having been dried by desiccant assemblies 52. In FIG. 1, such air flows through openings 56 provided in housing wall 30 to the reservoir.

When pressurized air is removed from housing port 22 in structure 14, such as when the above compressor is idle, and a back pressure exists at openings 56 in valve wall 30, such as provided by the pressure in reservoir 50, valve 10 closes, i.e., piston 20 moves to surface 16 of structure 14, with O-ring 34 being pressed against such surface. Spring 26 assists in the closing function.

Valve 10 is a simple structure, easily and inexpensively made, and is a compact, shallow structure, as discussed above, requiring a minimum amount of space. Yet the valve functions well in its assigned tasks, as described above.

While a presently preferred embodiment for carrying out the instant invention has been set forth in detail, those persons skilled in the air valve art to which this invention pertains will recognize various alternative ways of practicing the invention without departing from the spirit and scope of the claims appended hereto.

What is claimed is:

1. In combination a low profile valve located between a reservoir and desiccant dryers for discharging pressurized air, when open, and a system for utilizing such pressurized air, said system including said desiccant dryers connected upstream of said valve for supplying relatively dry air to said reservoir, and for closing the low profile valve when air pressure from a source of such air pressure connected to said valve is removed from the valve, the combination including in addition, a structure for receiving a shallow valve housing having a port disposed for connection to the reservoir, and a port for connection to said source of air pressure, and radial ports for connection to air operated valves connected between said low profile valve and reservoir for switching said dryers between said air drying function and a desiccant purging function, said shallow valve housing having ports for alignment respectively with the ports of said valve receiving structure for connection to the source of air pressure and reservoir when said housing is disposed in the valve receiving structure, and radial ports for alignment with the radial ports in the valve receiving structure for connection to the air operated valves through which pressurized air is directed to the air operated valves from the shallow valve housing when the valve is open for the switching of said dryers, a piston located in said shallow valve housing for axial movement therein, said piston having a face portion, a seal for sealing said face portion of the piston against a fixed surface of said valve receiving structure when the valve is closed to prevent air leakage from the reservoir to the source of air pressure, and a spring located about at least a portion of said piston for biasing the piston in the direction of said fixed surface and in a closed position.

2. The low profile valve of claim 1 wherein the seal on the face of said piston is an O-ring.

3. The low profile valve of claim 2 wherein the face of said piston is provided with a continuous slot f or containing the O-ring.

4. The low profile valve of claim 1 wherein an outer peripheral seal is provided on an outer surface of said shallow valve housing for sealing said housing in and to said receiving structure.

5. The low profile valve of claim 4 wherein the peripheral seal is an O-ring.

6. The low profile valve of claim 1 wherein the piston has a stem portion that extends through a wall of the valve housing, and a retaining ring is seated on said stem portion at a location outside of the housing wall for retaining the piston in said housing.

7. The low profile valve of claim 1 wherein the structure for receiving the shallow valve housing is a manifold block for a twin tower air dryer, said block having the fixed surface against which the piston face seals when the valve is closed.

* * * * *